US010007549B2

(12) United States Patent
Gottschlich et al.

(10) Patent No.: US 10,007,549 B2
(45) Date of Patent: Jun. 26, 2018

(54) APPARATUS AND METHOD FOR A PROFILER FOR HARDWARE TRANSACTIONAL MEMORY PROGRAMS

(71) Applicant: Intel Corporation, Santa Clara, CA (US)

(72) Inventors: Justin E. Gottschlich, Santa Clara, CA (US); Gilles A. Pokam, Fremont, CA (US); Shiliang Hu, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 14/581,772

(22) Filed: Dec. 23, 2014

(65) Prior Publication Data
US 2016/0179569 A1 Jun. 23, 2016

(51) Int. Cl.
| | | |
|---|---|---|
| *G06F 9/44* | (2018.01) | |
| *G06F 12/08* | (2016.01) | |
| *G06F 9/46* | (2006.01) | |
| *G06F 9/445* | (2018.01) | |
| *G06F 12/084* | (2016.01) | |
| *G06F 9/30* | (2018.01) | |
| G06F 12/0813 | (2016.01) | |
| G06F 12/0811 | (2016.01) | |

(52) U.S. Cl.
CPC .......... *G06F 9/467* (2013.01); *G06F 9/3004* (2013.01); *G06F 9/30087* (2013.01); *G06F 9/44563* (2013.01); *G06F 12/084* (2013.01); *G06F 12/0811* (2013.01); *G06F 12/0813* (2013.01)

(58) Field of Classification Search
None
See application file for complete search history.

(56) References Cited

U.S. PATENT DOCUMENTS

| | | | |
|---|---|---|---|
| 2007/0288902 A1* | 12/2007 | Lev | G06F 11/3632 717/124 |
| 2008/0127035 A1 | 5/2008 | Lev et al. | |
| 2012/0030518 A1* | 2/2012 | Rajwar | G06F 11/3476 714/38.13 |
| 2012/0084760 A1 | 4/2012 | Taillefer | |

OTHER PUBLICATIONS

Ruan et al., NPL: "Boosting Timestamp-based Transactional Memory by Exploiting Hardware Cycle Counters", Mar. 4, 2013.*
Yuschuk, NPL: OllyDbg Package Description, Feb. 18, 2014.*

(Continued)

*Primary Examiner* — Tracy Chan
(74) *Attorney, Agent, or Firm* — Nicholson De Vos Webster & Elliott LLP

(57) ABSTRACT

An apparatus and method are described for a hardware transactional memory (HTM) profiler. For example, one embodiment of an apparatus comprises a transactional debugger (TDB) recording module to record data related to the execution of transactional memory program code, including data related to the execution of branches and transactional events in the transactional memory program code; and a profiler to analyze portions of the recorded data using trace-based replay techniques to responsively generate profile data comprising transaction-level events and function-level conflict data usable to optimize the transactional memory program code.

14 Claims, 20 Drawing Sheets

(56) References Cited

OTHER PUBLICATIONS

Zyulkyarov, Ferad et al., "Debugging Programs that use Atomic Blocks and Transactional Memory". In : PPoPP 10 Proceedings of the 15th ACM SIGPLAN Symposium on Principles and Practice of Parallel Programming. ACM New York. 2010, pp. 57-66 . <http://dl.acm.org/citation.cfm?id=I693463>.

Willenberg, Rued Iger et al., Simulation-based HW/SW co-debugging for field-programmable systems-on-chi p, In : Field Programmable Logic and Applications (FPL) , 2013 23rd International Conference on. IEEE, 2013. pp. 1-8. <http : //ieeexplore.ieee.org>.

Transmittal of International Search Report and Written Opinion of the International Searching Authority from counterpart PCT/US2015/062053, dated Mar. 7, 2016, 11 pages.

International Preliminary Report on Patentability for Application No. PCT/US2015/062053, dated Jul. 6, 2017, 8 pages.

* cited by examiner

| FMT | CTR | TSD | CS | RSW | TSW |

```
Thread Id: 1
Commits: 1000, average # of instructions per commit: 175
Total # of instructions committed: 175560
Aborts: 9, average # of instructions per abort: 52
Total # of instructions aborted: 473

Start time: 78,843,926
End time:
Total time: 32,159,910

Aborts by threads:

Thread 4 -- aborts: 4, instr: 340

Thread Id: 2
Commits: 1000, average # of instructions per commit: 142
Total # of instructions committed: 142412
Aborts: 5, average # of instructions per abort: 56
Total # of instructions aborted: 280

Start time: 60,066,654
End time: 84,153,364
Total time: 24,087,310

Aborts by threads:

Thread 1 -- aborts: 1, instr: 0

Thread Id: 3
Commits: 1000, average # of instructions per commit: 485
Total # of instructions committed: 485996
Aborts: 20, average # of instructions per abort: 115
Total # of instructions aborted: 2315

Start time: 70,587,202
End time:
Total time: 63,756,410

Aborts by threads:

Thread Id: 4
Commits: 1000, average # of instructions per commit: 412
Total # of instructions committed: 412520
Aborts: 26, average # of instructions per abort: 111
Total # of instructions aborted: 2891

Start time: 89,972,645
End time:
Total time: 62,787,944

Aborts by threads:

Thread 1 -- aborts: 8, instr: 872
        Thread 3 -- aborts: 6, instr: 970
```

*Fig. 14*

APPARATUS AND METHOD FOR A PROFILER FOR HARDWARE TRANSACTIONAL MEMORY PROGRAMS

FIELD OF THE INVENTION

Embodiments of the invention relate generally to the field of computer systems. More particularly, the embodiments of the invention relate to an apparatus and method for a profiler for hardware transactional memory programs.

BACKGROUND

Multi-core processors and/or multi-threaded instruction execution pipelines within processing cores have caused software programmers to develop multi-threaded software programs. Multi-threaded software is naturally complex because of the different processes that concurrently execute. However, multi-threaded software is additionally difficult to debug because of an aspect of "non-determinism" in the manner of its execution. Specifically, a multi-threaded software program may execute differently across two different run-times even if the program starts from an identical input state.

For these reasons "logging" is used to record certain critical junctures in a multi-threaded software program's execution. Processors are presently designed with logging circuits that observe the execution of a processor's software and record certain critical events that the circuits have been designed to detect. If the software program crashes, the log record is analyzed to study the execution of the program leading up to the crash.

Hardware Transactional Memory (HTM) will soon be used as the cornerstone of many transactional memory (TM) systems. Unfortunately, performing logging and other profiling techniques on HTM systems poses new challenges because prior software-only profiling techniques have only been shown to be acceptable for software-only TM (STM) systems. Because hardware transactions execute an order of magnitude or more faster than software transactions, prior approaches that incurred roughly 10% overhead in software transactions will incur 100% or more overhead for hardware transactions. The profiling community generally agrees that anything over a 10% overhead in profiling data gathering is likely to introduce a probe effect that will change the contention signature of a multi-threaded program, which seems to indicate that these prior techniques are unlikely to be sufficient for HTMs.

BRIEF DESCRIPTION OF THE DRAWINGS

FIG. 11 illustrates an exemplary packet structure;

FIG. 14 illustrates an exemplary set of thread metrics for four different threads;

DETAILED DESCRIPTION

Exemplary Processor Architectures

Figure 1:
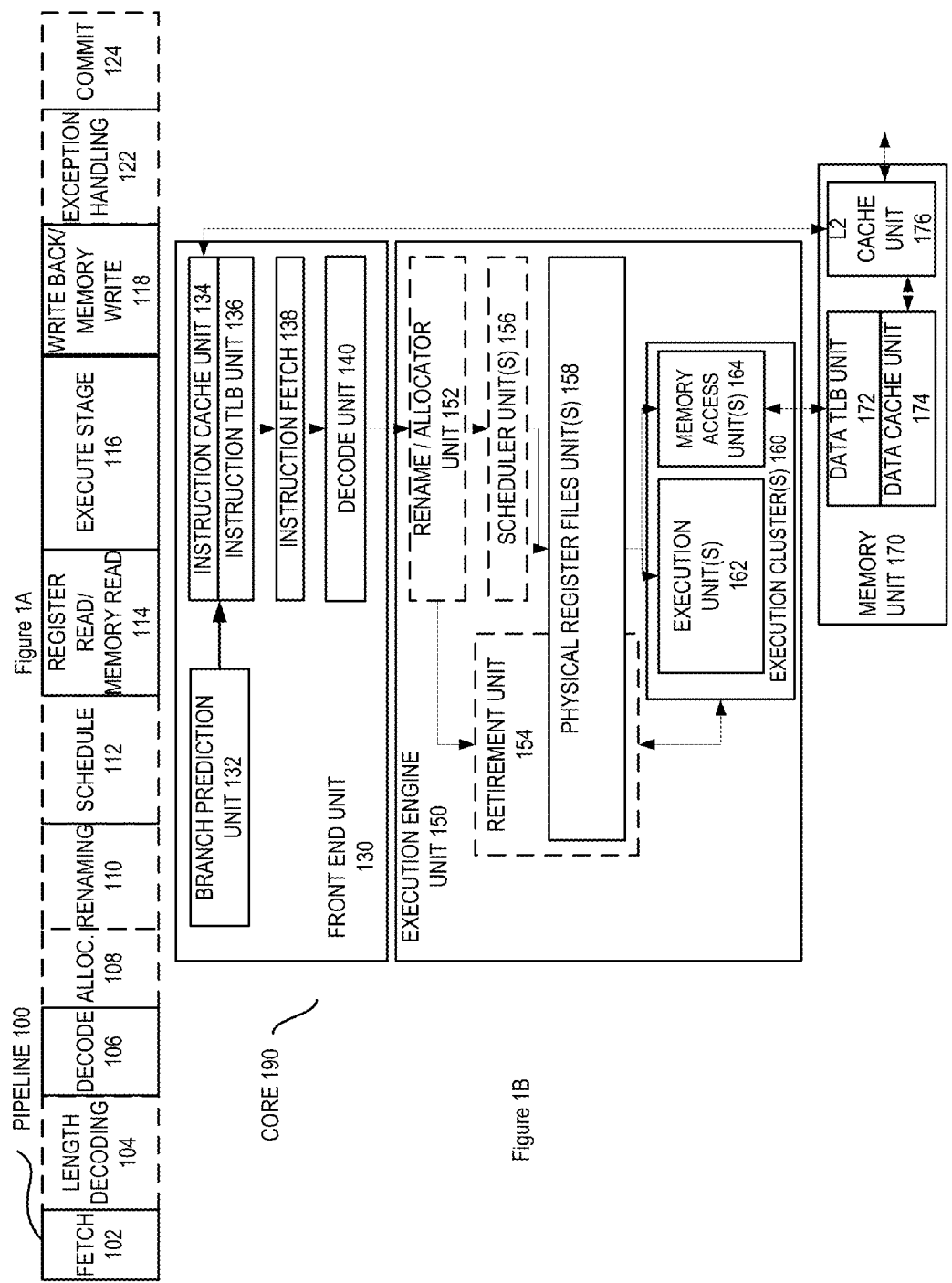
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
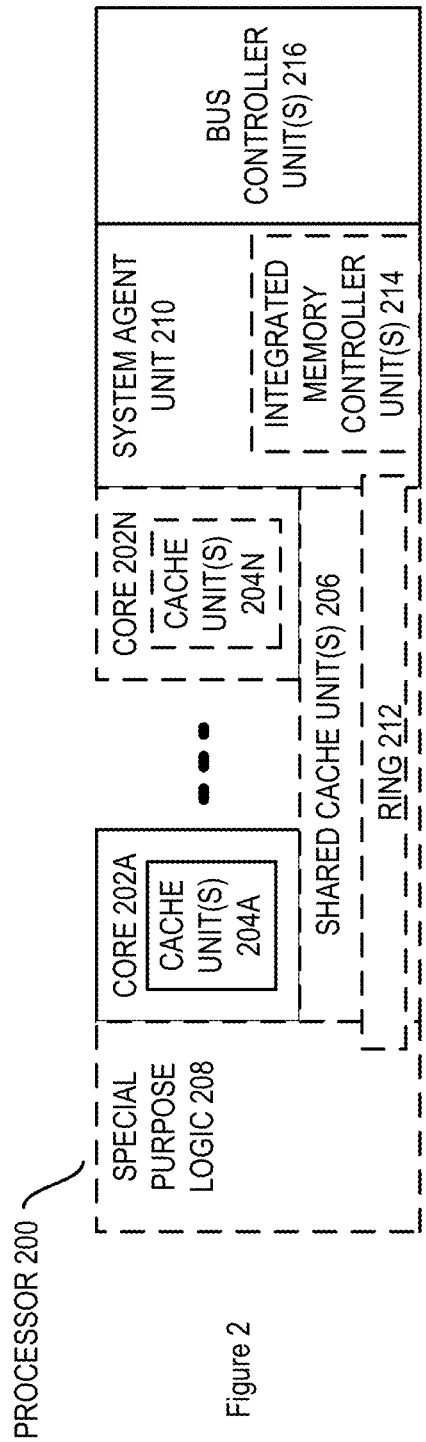
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
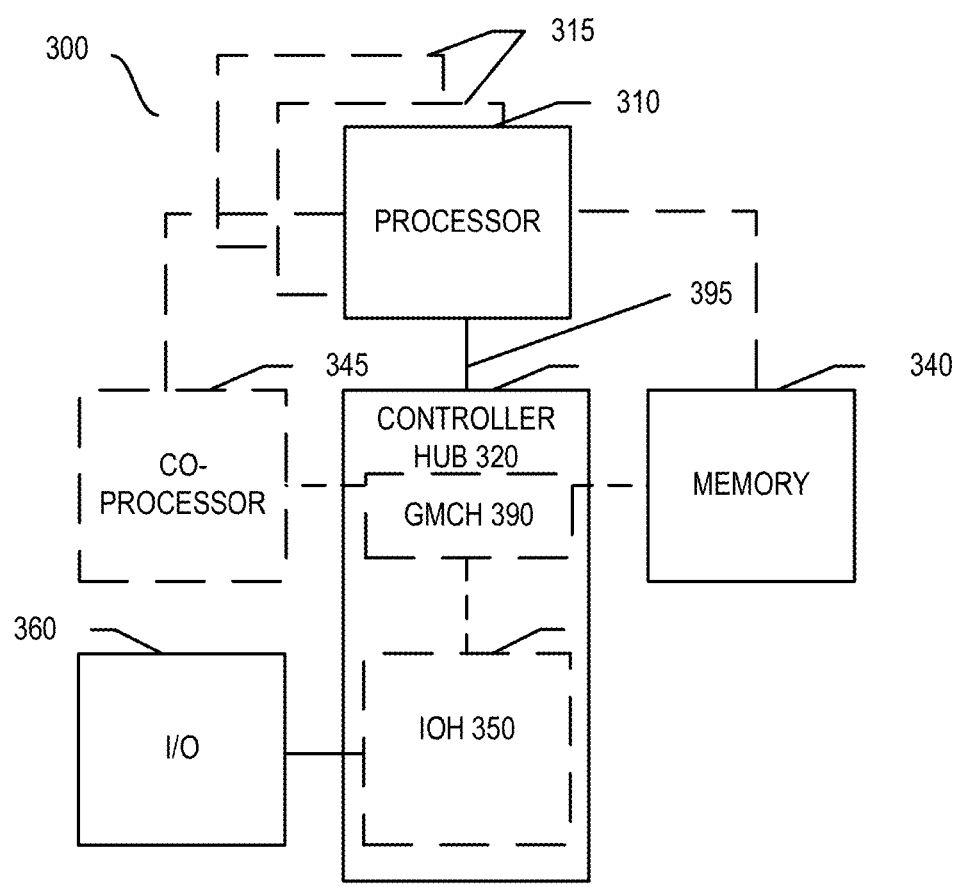
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
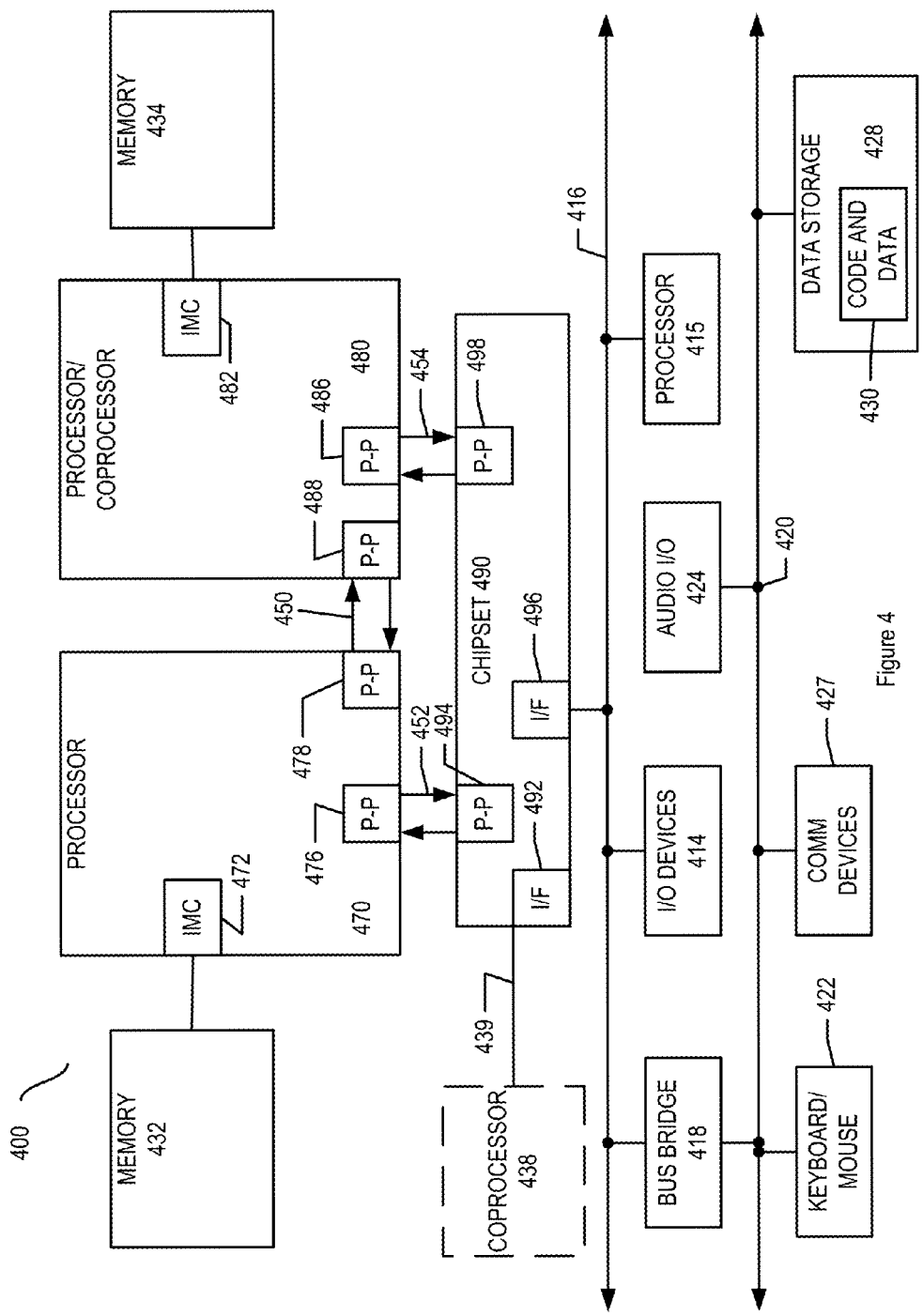
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
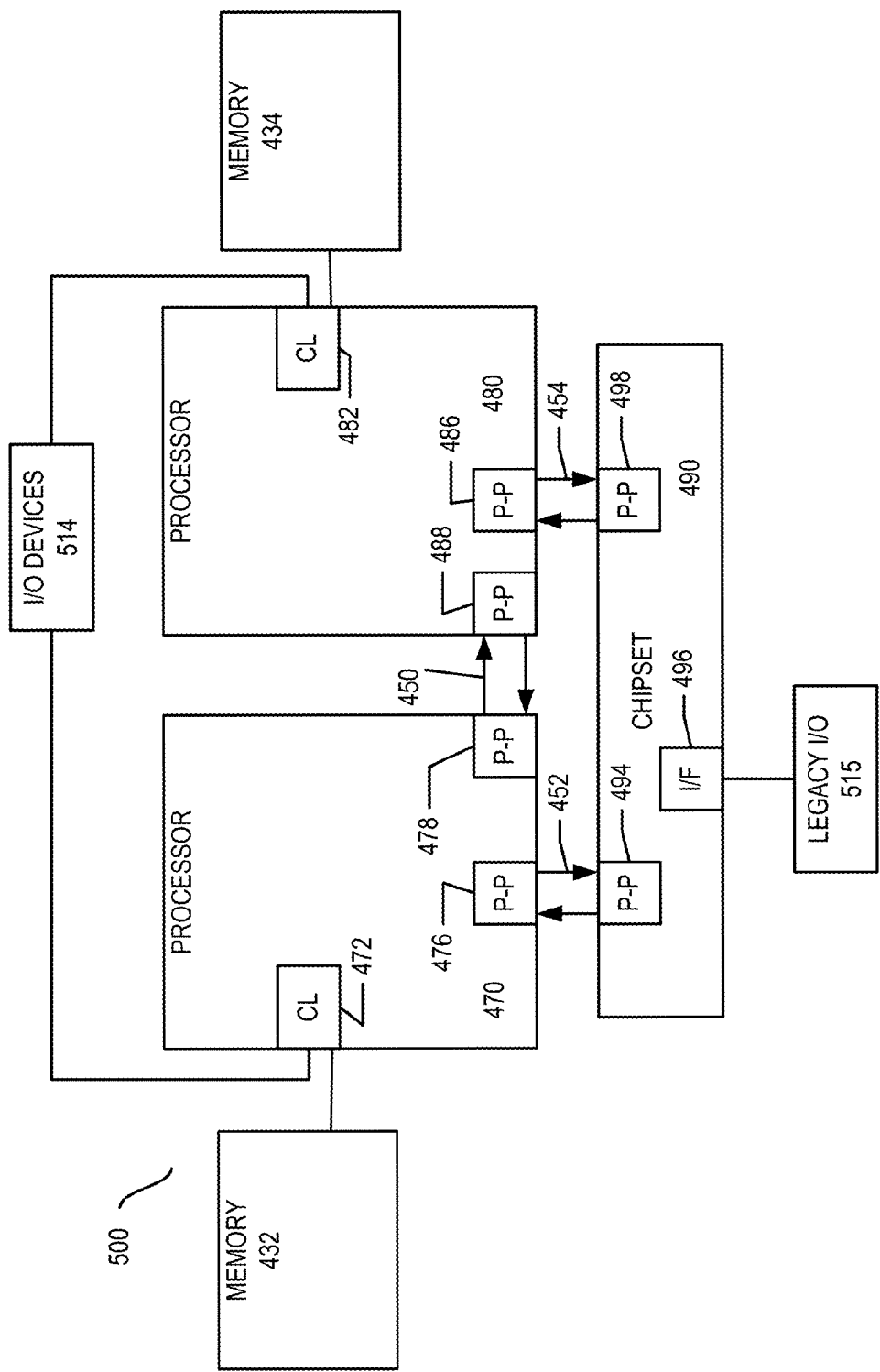
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
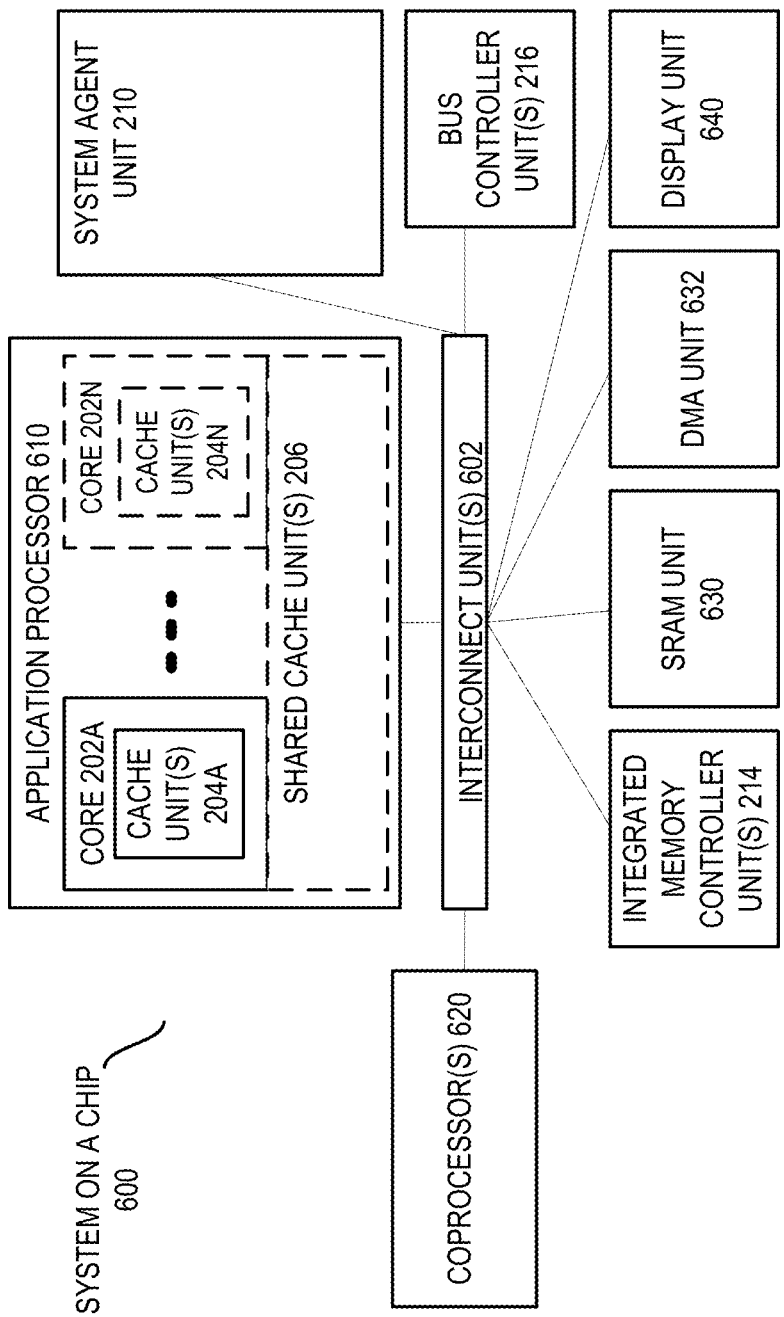
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
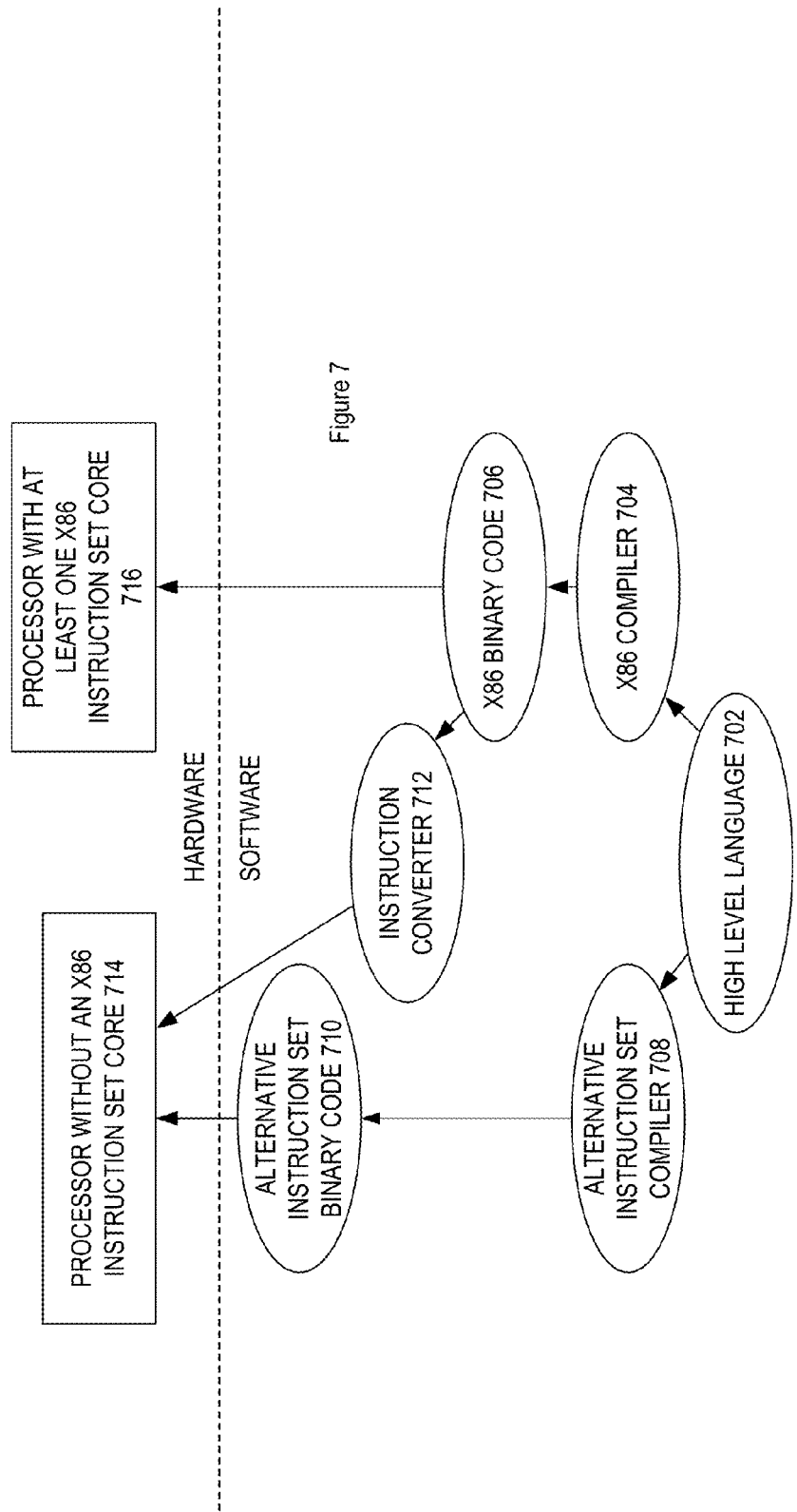
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716.

Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Figure 8:
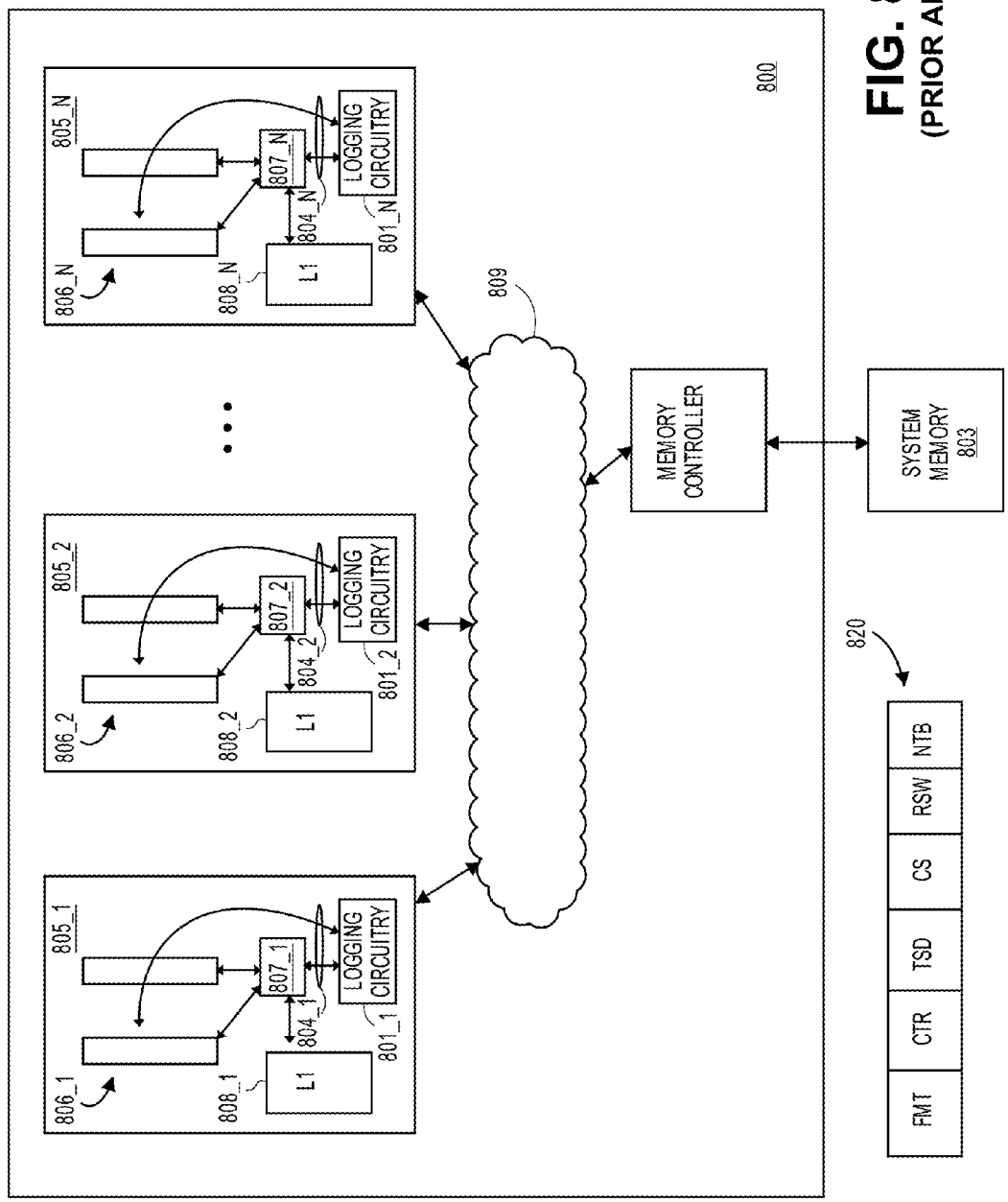
FIG. 8 illustrates an exemplary prior art processor with logging circuitry.

Processor with Transactional Capability and Logging Circuitry to Report Transactional Operations FIG. 8 shows a prior art processor 800 implemented on a semiconductor chip having logging circuitry 801_1 through 801_N for tracking specific aspects of multi-threaded program flow and recording such aspects externally from the processor 800 so that the program's execution can be later studied and understood. In an implementation, each instance of the processor logging circuitry 801_1 through 801_N is designed to look at each thread of its local processing core as being executed in "chunks" where certain, specific looked for events terminate a chunk. By storing the sequence of chunks for each thread in a storage location such as system memory 103 memory, the multi-threaded execution of a larger multi-threaded program that perhaps executes threads across all cores 805_1 through 805_X can be thoroughly analyzed.

Each instance of logging circuitry is assigned a specific region of system memory 803 in which to store its respective chunks. Each hardware thread executed by a particular core is allocated its own respective space within the system memory region allocated to the logging circuitry. Here, as is known in the art, a single instruction execution pipeline can concurrently execute multiple hardware threads (e.g., 8 hardware threads). Moreover, each processing core can contain more than one instruction execution pipeline (e.g., FIG. 8 shows each core having two instruction execution pipelines 806).

Hardware threads are understood to be the threads actively being executed within an instruction execution pipeline. Instruction execution pipelines are typically designed to concurrently execute a maximum/limited number of hardware threads where the maximum/limit is set by the hardware design of the pipeline. A software thread is understood to be a singular stream of program code instructions. The number of software threads supported by a processor can greatly exceed the number of hardware threads. A software thread is recognized as also being a hardware thread when the thread's state/context information is switched into an instruction execution pipeline. The software thread loses its hardware thread status when its state/context is switched out of the instruction execution pipeline. In one embodiment, there is one instance of logging circuitry per hardware thread (for simplicity FIG. 8 only shows one logging circuit per core).

In an implementation, a logging circuitry instance (e.g., instance 801_1) is designed to terminate a chunk for a thread on any of the following conditions: 1) a memory race condition; 2) a switch of the thread from an active to a hibernated state; 3) a translation look-aside-buffer (TLB) invalidation; 4) a transition of the thread outside a privilege level it was configured for (e.g., the thread transitions from a "user" privilege level to a "kernel" privilege level in response to an interrupt or exception); 5) the thread attempts to access an un-cacheable memory region. Here, any of the above described events contribute to the non-deterministic manner in which multi-threaded programs execute.

FIG. 8 also shows an inset 820 the prior art structure of a packet for a chunk of a particular thread. As observed at inset 820 the packet includes: 1) a packet format identifier (FMT); 2) the termination reason for the chunk (CTR); 3) a differential timestamp (time between this packet and previous chunk's packet) (TSD); 4) the number of instructions that were executed by the chunk between the thread's previous chunk's termination and the chunk's termination (CS); 5) the number of outstanding writes for the chunk (i.e., the number of retired but not yet globally visible (committed) store operations) (RSW); 6) the number of retired load/store operations of the oldest not yet retired macro instruction (NTB). In an embodiment, the core ID and the thread ID are added by a software layer which can determine both based on where the chunk is stored in system memory 803.

Here, each logging circuitry instance 801_1 through 801_N is coupled to "hooks" 804_1 through 804_N in their respective processing cores 805_1 through 805_N of the processor (e.g., in the vicinity of the instruction execution pipelines 806_1 through 806_N that execute the respective instruction streams of the various software threads) that are designed to detect the looked for chunk termination events. During execution of a particular thread, the various hooks detect a chunk termination event for the thread and report the event to the logging circuitry 801. In response, the logging circuitry 801 formulates a packet consistent with the structure of inset 820 and causes the packet to be written to external memory 803.

One of these hooks within each core is coupled to a memory race detection circuit 807_1 through 807_N. As observed in FIG. 8, there is one memory race detection circuit for each processing core coupled proximate to the core's L1 cache 808_1 through 808_N. Each memory race circuit 807_1 through 807_N is designed to detect memory races at its associated L1 cache.

A memory race occurs when two different software processes (e.g., two different threads) try to access the same memory location and at least one of those memory accesses is a write. Here each thread remembers all memory accesses (addresses) of the current chunk. A chunk is terminated and a new chunk is created when a conflict to one of the addresses remembered by the current chunk is detected (no matter how long this access is in the past).

Notably a race can be caused when two different threads on a same core attempt to access the same memory location or when two different threads on two different cores attempt to access the same memory location. In the case of the later, a first core will snoop a second core's L1 cache. Here, interconnection network 809 is used to transport such snoops.

Each memory race detection circuit 807_1 through 807_N tracks recent read operations and recent write operations (referred to as "read sets" and "write sets") and compares them to incoming read requests and incoming write requests. A memory race circuit will detect a memory race condition anytime it detects concurrent "read-after-write" (RAW), "write-after-write" (WAW) or "write-after-read" (WAR) operations directed to the same memory address. In various embodiments, the identity of the conflicting address may optionally be included in the chunk (depending on whether larger or smaller chunks are desired) that is recorded for a memory race.

Figure 9:
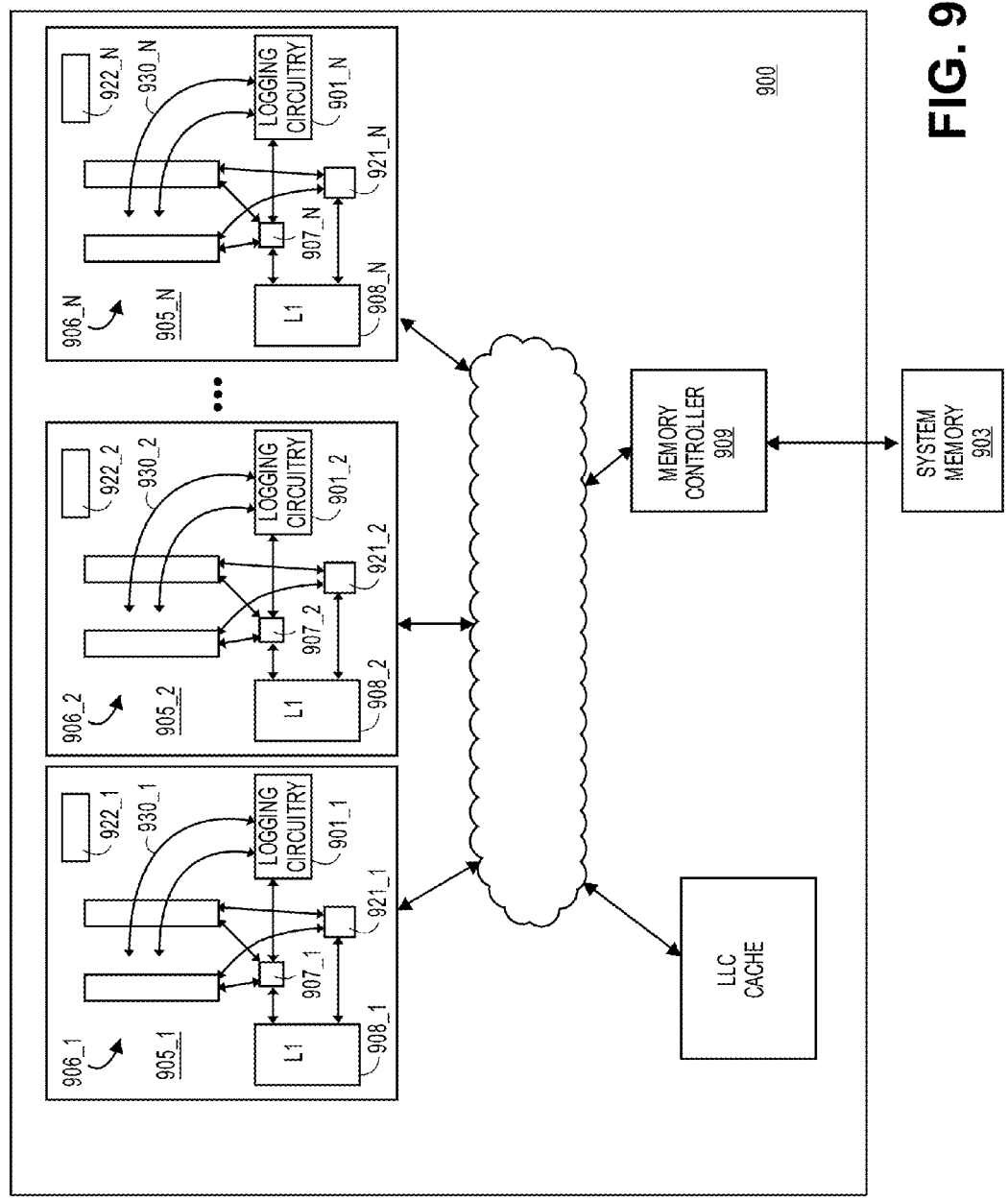
FIG. 9 illustrates an improved processor with transactional capability and logging circuitry.

FIG. 9 shows an improvement to the prior art processor of FIG. 8. Here, the improved processor of FIG. 9 in an embodiment assumes all of the functionality described above with respect to FIG. 8 plus the additional improvements described immediately below.

As observed in FIG. 9, the processor's individual cores 905_1 through 905_N include the additional capability of executing "transactions". The execution of transactions corresponds to execution of speculative code well beyond traditional speculative execution boundaries. Traditional speculative execution, such as branch prediction, permits an instruction execution pipeline to execute a program along a program branch before confirmation that the direction taken was the correct program flow path. Here, results of executed instructions are contained (e.g., in a reorder buffer) internal to the pipeline but not written externally to a processor's architectural state (registers). As such, results of the speculatively executed instructions are not globally visible. If the predicted branch is incorrect the pipeline is flushed and program flow restarts from the incorrectly predicted branch. If the prediction is correct, the instruction results are committed to the architectural state external to the pipeline for global viewing by other processes. In general, however, the amount of data changes that can be contained is of limited size and therefore the amount of speculatively executed code is limited.

By contrast, processing cores that support transactions permit speculative execution well beyond the type of speculative execution discussed above (although the cores of FIG. 9 may also be designed to include branch prediction). Current hardware transactional memories store speculative writes in the L1 or L2 cache. If the transaction is aborted, the cache data is discarded and the memory changes are never pushed to main memory, so other cores never see them. In the event of hyper-threading (i.e., SMT), a context switch automatically aborts an active transaction, so another software transaction executing on the same core, cannot see an in-flight transaction from another software thread. In the case of transactions, processes are able to execute "as if" they have placed locks on shared items of data. In a basic approach, a process (e.g., a software thread) acquires a lock on an entire database (e.g., an entire shared memory, such as LLC cache and/or system memory 903 or region thereof where the process's data is kept). The process executes some logic and, upon completion of the logic, determines that changes need to be made to one or more of the data items. The process then "commits" the data items to the database and releases the lock on the database thereby permitting other processes to access the data items.

In an implementation, the execution pipelines 906_1 through 906_N of the processor have enhanced functional units to support instructions (e.g., XACQUIRE and XRELEASE) that permit a software thread to believe it has locked a database as described above. That is, the XACQUIRE instruction when executed announces the beginning of speculative execution and the acquisition of a lock on a database. The XRELEASE instruction when executed announces the end of speculative execution and the release of the lock on a database. Importantly, in an implementation, the underlying hardware of the processor 900 acts more to let the software thread believe it has placed a lock on the database when, in fact, it has technically not locked the entire database, but rather, caused conflict detect hardware 921 within the processor to look for and enforce serial operation between competing threads for a same data item.

Here, it should be clear that permitting a first software thread to lock an entire database can hurt performance if there exists another parallel thread that would like to use the same database. The second thread would have no choice but to wait until the first thread commits its data to the database and releases the lock. In effect, actually locking an entire database would cause two concurrent threads that use the same database to execute serially rather than in parallel.

As such, the XACQUIRE instruction has the effect of "turning on" conflict detect hardware 921 within the processor that understands the database (e.g., system memory or a specific portion thereof) is supposed to "behave as if locked". This means the conflict detect hardware 921 will permit another process to access the database so long as the access does not compete with the accesses made by the process that executed the XACQUIRE instruction and believes it has acquired a lock (here, a competing access is understood to mean a same memory address). If competing accesses are detected, the thread is "aborted" which causes the transaction's state to flush and the program to return to the XACQUIRE instruction to restart another attempt for the transaction. Here, the conflict detection circuitry 921 detects when another process has attempted to access a same memory location as a transaction that has executed XACQUIRE and is executing within a speculative region of code.

In another implementation, the processor also supports additional instructions that permit more advanced transactional semantics (e.g., XBEGIN, XEND and XABORT). XBEGIN and XEND act essentially the same as XACQUIRE and XRELEASE, respectively. Here, XBEGIN announces the beginning of speculative execution (turns on conflict detection circuitry 921) and XEND announces the end of speculative execution (turns off conflict detection circuitry 921). Operation is as discussed above except that a transaction abort leaves an error code in control register space 922 (e.g., EAX model specific register space implemented with one or more register circuits) of a core that executed the aborted thread providing more details about the abort (e.g., abort caused by ABORT instruction, transaction may succeed on retry, conflict caused abort, internal buffer overflowed, debug breakpoint was hit, abort occurred during nested transaction).

The information left in the register space 922 can be used to direct program flow after an abort to other than into an automatic retry of the transaction. Additionally, the processor may support an instruction (e.g., XABORT) that explicitly aborts the transaction. The XABORT instruction gives the programmer the ability to define other transactional abort conditions other than those explicitly designed into the processor hardware. In the case of XABORT, the EAX register will contain information provided by the XABORT instruction (e.g., describing the event that caused its execution)

Processors providing transactional support add to the complexity of debugging multi-threaded program code. As such, the improved processor 900 of FIG. 9 includes additional enhancements to the logging circuitry 901 that are designed to identify the existence of transactions and delineate chunks based on them. More specifically, additional hooks 930 within the cores are observed in FIG. 9 that are designed to: 1) detect execution of an instruction that signifies the beginning of a transaction's execution of speculative code (e.g., XACQUIRE or XBEGIN) and report the event to the logging circuitry 901; and, 2) detect execution of an instruction that signifies the end of a transaction's execution of speculative code (e.g., XRELEASE or XEND) and report the event to the logging circuitry 901. In response to either of these events, the logging circuitry 901 will terminate a chunk, create a packet that describes the chunk termination and report the packet out to system memory 903 (e.g., via memory controller 909).

Additionally, the new hooks 930 will report the existence of an aborted transaction. In response the logging circuitry 901 will terminate a chunk, create a packet that describes the chunk termination and write the packet out to system memory 903. Notably, in this approach, the detection of an abort for logging purposes rides off the conflict detection circuitry 921 within the processing cores 905 that actually detects conflicts for aborting transactions rather than on the memory race detection circuitry 907. The relationship between the conflict detection circuitry 921 and the memory race detection circuitry 907 is discussed in more detail below. In an implementation where the processor includes register space 922 that contains additional information describing an abort (e.g., the aforementioned EAX register space), the additional hooks 930 are further designed to report the information contained in the register space 922 to the logging circuitry 901. In processors that support an instruction that explicitly terminates a transaction (e.g., XABORT), a transaction abort packet will also be created and reported out (e.g., with EAX register content if available).

Figure 10A:
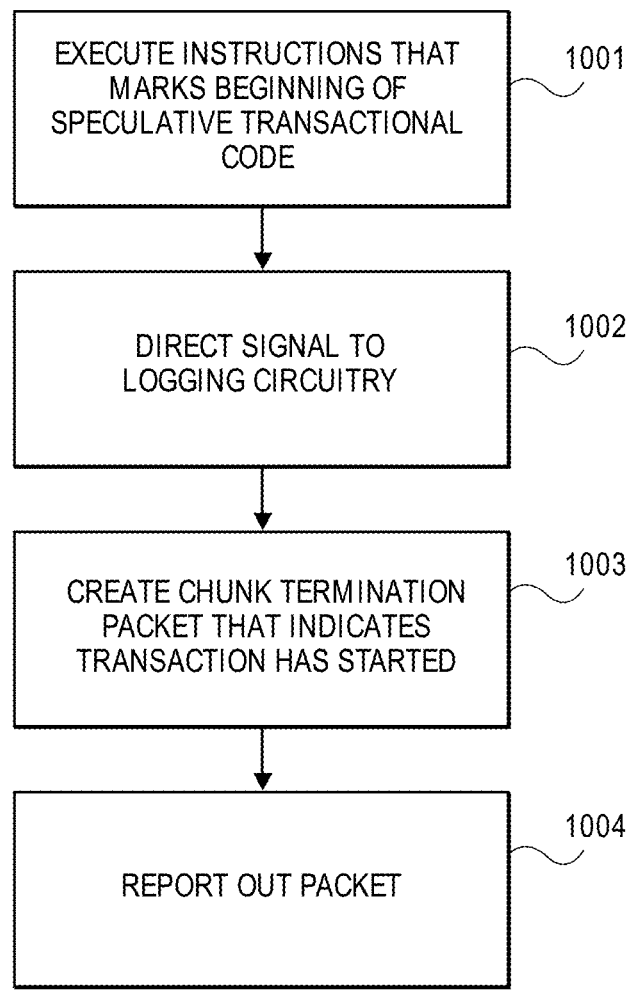
FIG. 10a illustrates a first method that can be executed by the processor.

FIG. 10a shows a first methodology performed by the processor of FIG. 9. As observed in FIG. 10a, an instruction is executed that marks the beginning of the execution of speculatively executed transactional code 1001. In an embodiment the instruction is not deemed "executed" until it is retired. In response to the execution of the instruction, a signal is directed to logging circuitry 1002. In response to the signal, the logging circuitry creates a chunk termination packet that indicates the chunk is being terminated because a transaction has started 1003. The chunk termination packet is reported out 1004 (e.g., by being written into external system memory).

Figure 10B:
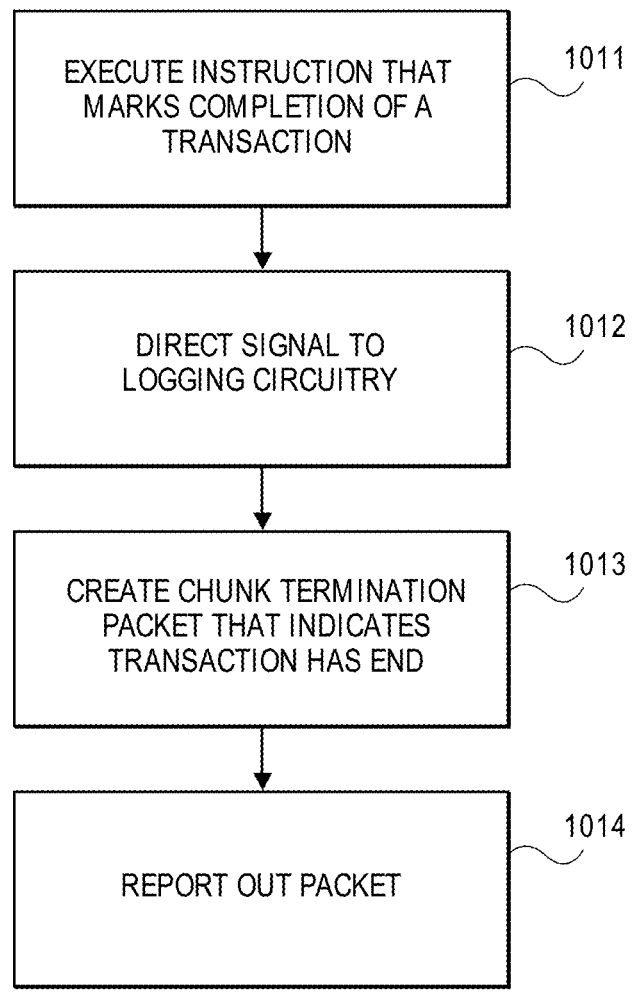
FIG. 10b illustrates a second method that can be executed by the processor.

FIG. 10b shows a second methodology performed by the processor of FIG. 9. As observed in FIG. 10b, an instruction is executed that marks the end of the execution of speculatively executed transactional code (e.g., after the transaction has successfully committed its data changes) 1011. In an embodiment the instruction is not deemed "executed" until it is retired. In response to the execution of the instruction, a signal is directed to logging circuitry 1012. In response to the signal, the logging circuitry creates a chunk termination packet that indicates the chunk is being terminated because a transaction has ended 1013. The chunk termination packet is reported out 1014 (e.g., by being written into external system memory).

Figure 10C:
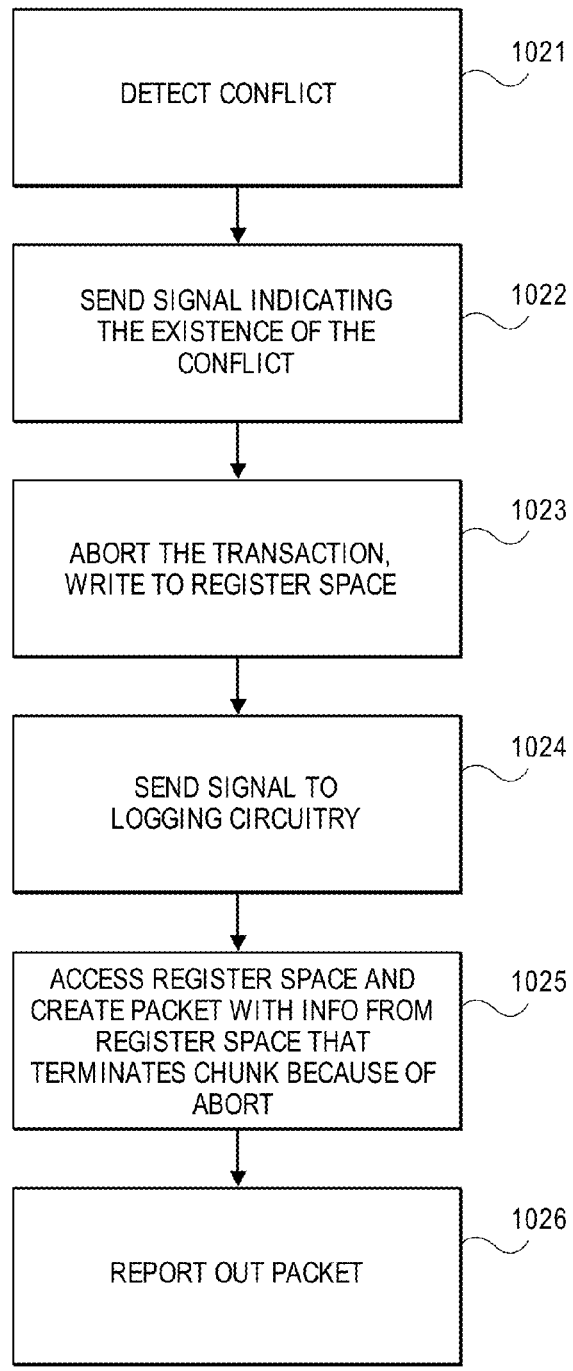
FIG. 10c illustrates a third method that can be executed by the processor.

FIG. 10c shows a third methodology performed by the processor of FIG. 9. As observed in FIG. 10c, hardware (e.g., conflict detection circuitry 921) detects that an access has been attempted by another thread to a memory location accessed by a transaction 1021. A signal is sent indicating the existence of the conflict 1022 (e.g., from conflict detection circuitry 922 to the processing core pipeline that is executing the transaction). In response to the signal, the transaction is aborted and information is written into control register space 1023. In response to the abortion of the transaction, a signal is sent to logging circuitry 1024. In response to the signal sent to the logging circuitry, the logging circuitry accesses the register space and creates a chunk termination packet that indicates the chunk is being terminated because a transaction has aborted and which includes information from the register 1025. The chunk termination packet is reported out 1026 (e.g., by being written into external system memory).

Figure 10D:
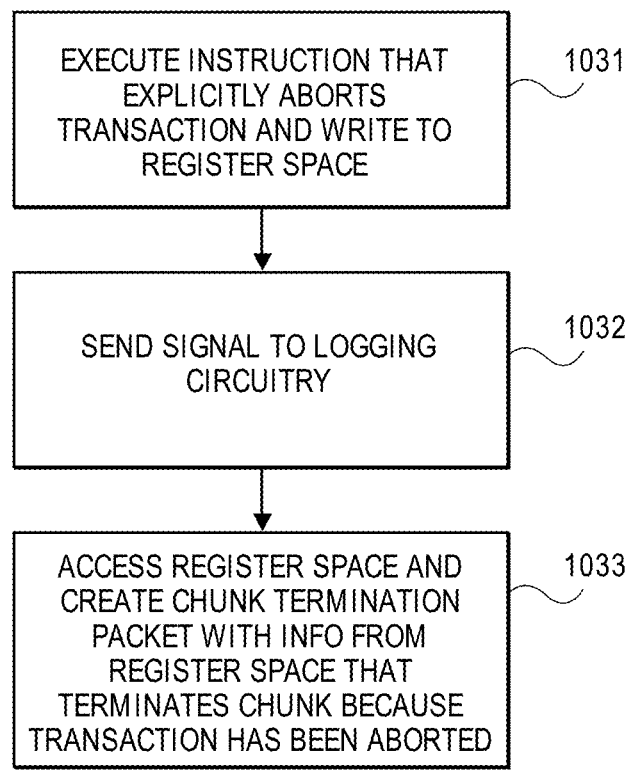
FIG. 10d illustrates a fourth method that can be executed by the processor.

FIG. 10d shows a fourth methodology performed by the processor of FIG. 9. As observed in FIG. 10d, an instruction is executed that explicitly aborts a transaction and information is written into a control register 1031. In response to the abortion of the transaction, a signal is sent to logging circuitry 1032. In response to the signal sent to the logging circuitry, the logging circuitry accesses the register and creates a chunk termination packet that indicates the chunk is being terminated because a transaction has aborted and which includes information from the register 1033. The chunk termination packet is reported out 1034 (e.g., by being written into external system memory).

Figure 11:
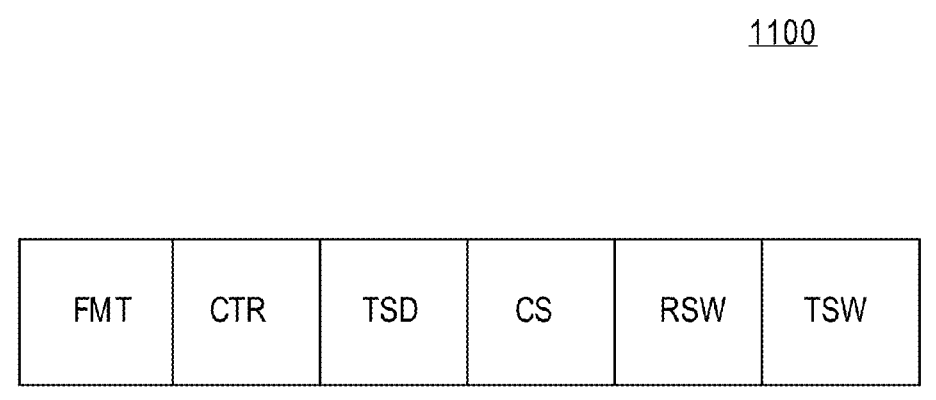

FIG. 11 shows an embodiment of a packet structure 1100 that is written out by the logging circuitry 901 of FIG. 9 when writing out transaction related chunk termination packets. As observed in FIG. 11, the packet structure largely maintains the same structure as the prior art packet 820 of FIG. 8. Here, unlike the prior art packet 820, however, the chunk termination reason (CTR) field of the packet can contain information indicating any of the additional events: 1) transaction start; 2) transaction end; and, 3) transaction abort. In a further implementation, the CTR field can additionally indicate whether the processor supports an explicit abort instruction (e.g., XABORT).

An additional improvement over and above the packet structure of FIG. 8 is that the number of retired load/store operations of the oldest not yet retired macro instruction information (NTB in packet 820 of FIG. 8) is replaced with a "transaction status word" (TSW) that provides additional information describing the chunk termination for transactions (e.g., for cases where the CTR is a transaction termination).

In an implementation, the TSW contains the contents of the (e.g., EAX) control register in the case of a transaction abort, or, the contents of a "transaction nested counter" register (not depicted) in the case of a transaction start or transaction end. In the case of a transaction abort, in an embodiment, the contents of the EAX control register indicate: 1) if the abort is from an XABORT instruction; 2) whether the transaction may succeed on retry; 3) if the abort is from a conflict; 4) if the abort is from an overflow; 5) if the abort is from a debug breakpoint; 6) whether the aborted transaction is nested. For nested transactions, the processor is designed to support a string of transactions within a transaction (e.g., a first transaction can start another transaction and so on). The transaction nested counter value within its reserved register space essentially keeps track of which inner transaction (if any) the current transaction pertains to.

In an implementation, the memory race detection circuitry 907 (part of the prior art logging technology of FIG. 8) can be enabled while the special hooks for transaction abort detection 930 and logging are also enabled. This can be achieved by designing the processor 900 of FIG. 9 with a mode that permits both the new transactional hooks 930 and the memory race hooks to both be enabled and active at the same time. This permits, for example, all conflicts to have potentially occurred within a transaction to be recorded (e.g., because the memory race hooks cause the logging circuitry 901 to report out on any detected conflicts during execution of the transaction (notably, a memory race condition and a conflict are similar events)). This additional information may be particularly useful in an implementation where the control register information that is provided commensurate with an abort (e.g., the aforementioned EAX register) does not specify the specific memory address having the conflict that caused the transaction to abort (in other alternative implementations, the conflict detect circuitry 922 can be modified to report this information for entry into the register space).

Also, the TSW information of a chunk termination packet can include information pertaining to an abort as to whether or not the memory race detection circuitry 907 detected any conflicts. If not, it is suggestive that the conflict detection circuitry 921 that aborted the transaction actually experienced a "false positive" conflict. In an implementation, false positives are possible at the conflict detection circuitry 921 because of the fact that caches (such as an L1 cache) use hashing circuits to determine where a cached item of data is to be stored and, typically, multiple different memory addresses can hash to a same caching storage location. In a further implementation, the memory race detection circuitry 907 is also capable of generating false positives for similar reasons—although the hashing and storage of memory addresses can be different in the memory race detection circuitry (e.g., a bloom filter is used to keep the read and write sets and memory addresses are hashed to a specific bloom filter location) than in the caching circuitry where the transaction conflict detection circuitry 921 resides. As such, in this case, if the memory race detection circuitry reports any conflicts they cannot be completely relied upon for detecting transactional aborts.

In a further embodiment, the CTR information of a transaction related chunk termination packet indicates whether the transaction was terminated because of a late lock acquire (LLA). A late lock acquire is a special circumstance that permits a transaction to commit its data even though the transaction has not completed. Typically LLAs are imposed when the transaction needs to be "paused", e.g., in response to an exception or unsafe instruction so that its state can be externally saved. After the transaction's state is externally saved, the transaction resumes normal operation. In this case, again, hooks within the processing cores report out the occurrence of any LLA event to the logging circuitry 901 which reports out a chunk termination event pertaining to the LLA and its termination of the transaction.

The logging circuitry 901 can be implemented in any number of ways. At a first extreme the logging circuitry 901 can be implemented completely in dedicated, custom logic circuitry. At another extreme the logging circuitry 901 can be implemented as a micro-controller or other form of program code execution circuitry that executes program code (e.g., firmware) to perform its various functions. Other blends between these two extremes are also possible.

As any of the logic processes taught by the discussion above may be performed with a controller, micro-controller or similar component, such processes may be implemented with program code such as machine-executable instructions that cause a machine that executes these instructions to perform certain functions.

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Apparatus and Method for a Profiler for Hardware Transactional Memory Programs The additional embodiments of the invention described below include a software method, which uses trace-based replay, to perform thread-level and function-level profiling analysis of hardware transaction memory (HTM) programs recorded using the hardware extensions described above (e.g., FIGS. 8-11 and associated text). In particular, these embodiments of the invention include a software profiling technique that provides thread-level profiling data of a transactional memory (TM) program recorded using the hardware extensions described above.

Execution-based replay, where a program is re-executed and replayed in the precise manner in which it was recorded, can provide a significant and detailed analysis of a TM program recorded using the HTM extensions described above. However, it can also be prohibitively slow, such that in many real world cases the replayed execution time is one to two orders of magnitude (10×-100×) slower than a non-replayed execution. In real world cases where programs execute for an extended period of time, such as hours, a full execution-based replay of such a recorded system might take days, weeks or even months to complete. As such, this overhead is unacceptable for many real-world applications.

A trace-based replay mechanism is described herein which extrapolates performance bottlenecks of a given TM program by processing and analyzing all of the recorded execution data. Because trace-based replay does not actually re-execute the program, such replay can be as fast as executing the original program. In fact, in some cases, trace-based replay can be significantly faster than the corresponding time it took to execute the original program.

Because the techniques described below use trace-based replay, the precise transactional conflict data that can be gathered from an execution-based replay may not be provided. However, such precise conflict detection profiling is not always needed. In cases where only thread-level profiling data with function-level precision is necessary, which will likely be a common "first pass" profiling practice, these embodiments of the invention can significantly reduce the time it takes a system to generate profiling data for a TM program (e.g., a one to two orders of magnitude improvement in profiling analysis over execution-based replay).

The described approach is an improvement over known solutions such as described in Gottschlich et al., "Visualizing Transactional Memory", PACT 2012 and Zyulkyarov et al. and "Discovering and Understanding Performance Bottlenecks in Transactional Applications", PACT 2010. First, using the hardware extensions described above, these embodiments suffer negligible profile data gathering overhead, making them a feasible approach for hardware transactions. No prior systems can provide acceptable profiling data gathering overhead. Second, the techniques described herein extract profiling data orders of magnitude faster than the best known execution-based replay techniques, making them practical for environments where recorded executions last minutes to hours to days. The tradeoff of such an approach is that the described embodiments have reduced precision on terms of transactional conflicts. However, as our experimental data demonstrates, such transactional conflict data is not always needed. In cases such as these, the described embodiments provide a programmer with a fast turnaround time for profiler analysis of a transactional program.

Figure 12:
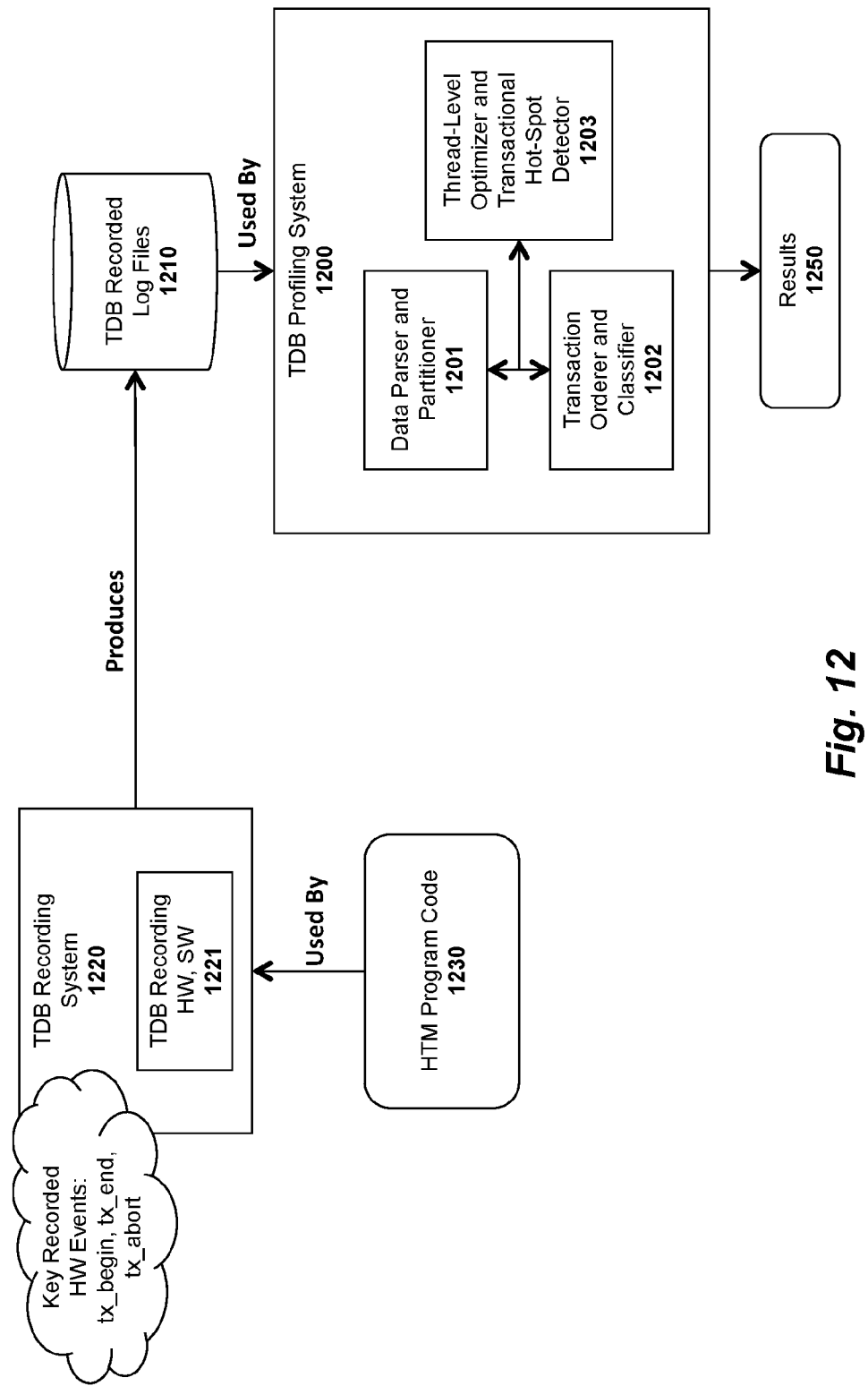
FIG. 12 illustrates an exemplary architecture including a profiling system.

FIG. 12 illustrates the system components used in accordance with one embodiment of the invention, including a transactional debugger (TDB) recording system 1220 which includes TDB recording hardware and/or software 1221 (e.g., an operating system) to record TDB data responsive to the execution of transactional memory program code 1230 (e.g., using the hardware extensions described above). The collected TDB data is then stored in a set of TDB recorded log files 1210 which is used by a TDB profiler system 1200. As illustrated, one embodiment of the TDB profiling system 1200 includes three components used to perform profiling using trace-based replay techniques: (1) a data parser and partitioner 1201; (2) a transaction orderer and classifier 1202; and (3) a thread-level optimizer and transactional hot spot detector 1203.

1. Data Parser and Partitioner

In one embodiment, the data parser and partitioner 1201 processes the TDB recorded log files 1210. Although much of the functionality is what one would expect with any data parser, some aspects are uniquely tailored to the needs of the TDB system:

Multithreaded:

Shared memory and transactional event packet information is parsed/generated. Once example of such a packet is described above with respect to FIG. 11 and may contain various elements related to the instructions executed such as universal timestamp information (e.g., for guaranteed synchronicity across threads) which may include a transaction start, transaction end, and transaction abort timing data. The event packet information may also include the transaction status word (TSW) discussed above.

Single Threaded:

Branch trace packet information. These packets contain information about branches that are taken throughout the program. This information may be used against a disassembled binary to identify the instruction pointer location, and likewise, the precise function being executed when a transactional event occurs (e.g., what function was being executed when a transactional conflict occurred).

Because the data being processed from a recorded execution can be exceptionally large, one embodiment of the system uses a data partitioner (within the parser and partitioner module 1201) to minimize the overhead incurred by each packet. For example, branch trace packets contain a significantly smaller amount of data than the shared memory or transactional packets. As such, one embodiment defines these small packets in a more compressed fashion.

The side-effect of this compression is that it requires a separation of execution ordering for profiling analysis because the packets are not unified in their software representation. However, as discussed below with respect to the transaction orderer and classifier, multiple interfaces may be provided to access the recorded execution stream, one of which allows all events to be pulled from the same stream, which simplifies processing profiling information when data lies across branch event and transaction event streams.

2. Transaction Orderer and Classifier

One embodiment of the system uses a multithreaded transaction orderer and classifier 1202, which provides multiple streams (APIs) for accessing the transactional data, branch data, or both. Details of one embodiment of the transaction orderer and classifier 1202 are shown in FIG. 13 including a branch trace stream 1301 and transaction event stream 1303 used to identify transactional events with function-level conflict data 1302.

Figure 13:
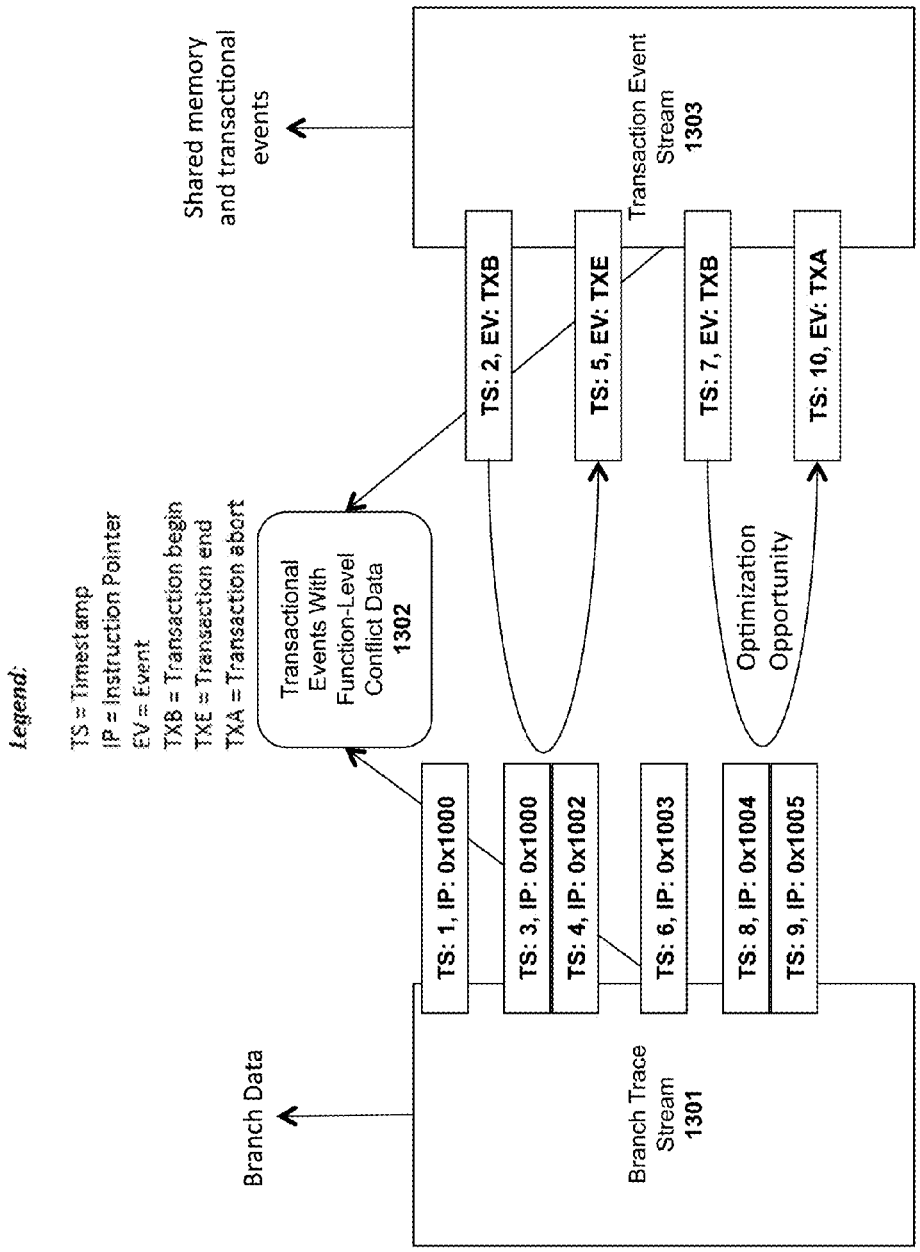
FIG. 13 illustrates one embodiment of a transaction orderer and classifier module.

Specifically, FIG. 13 illustrates how using a combination of both the execution branch trace information and the transaction event information, transaction-level events can be extracted and cross-correlated to disassembled binary information, allowing transaction aborts to be correlated to at least the current function being executed when the transaction was aborted.

In one embodiment, this is done in the following manner. When a transaction abort occurs, the profiling system performs a reverse lookup to find the corresponding "transaction begin" event. Once identified, the timestamp range of all possible branches taken during the transaction's execution are captured (from the branch trace stream 1301). Each of the instruction pointers (IPs) from the branches contained within the surrounding timestamp range are used against the disassembled binary of the executed program. Once the corresponding IPs are found in the disassembled binary, the function (or functions) that use those IPs are identified, allowing the programmer to see which function (or functions) caused the transactional conflict and, therefore, which function (or functions) should be analyzed for performance optimization.

3. Thread-Level Optimizer and Transactional Hot Spot Detector

In addition to providing the basic metrics for each thread shown in FIG. 14 (which illustrates metrics for four threads having thread IDs 1-4), one embodiment of the system extrapolates which threads are likely to incur the greatest performance improvement, by analyzing the extracted high-level data shown in FIG. 14. This hot spot detection is useful for pointing the programmer to a general area of interest.

When using the high-level data shown in FIG. 14 and then using the lower-level data from FIG. 13, thread-level transaction performance bottlenecks can be identified with function-level precision, all without the need for execution-based replay.

Figure 15A:
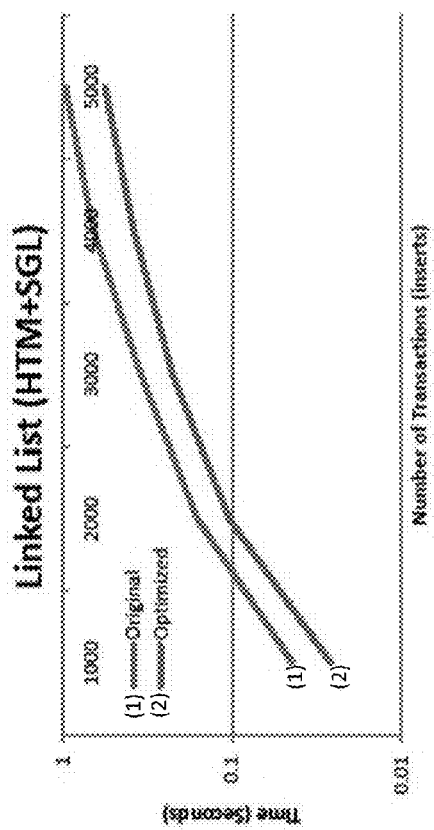
FIGS. 15A-C illustrate an exemplary set of optimization results from an embodiment of the invention.
Figure 15B:
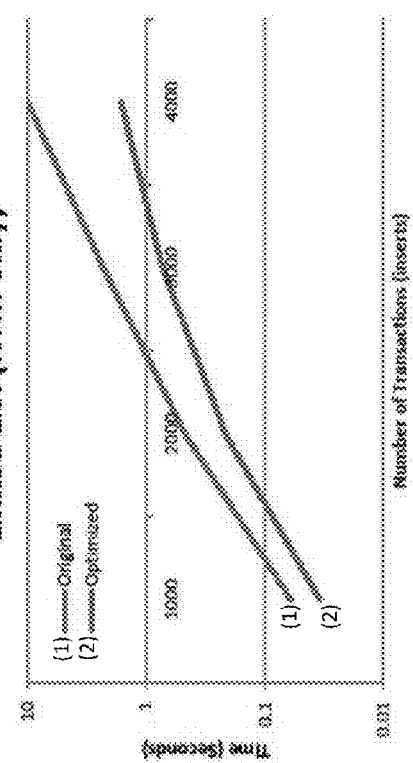
Figure 15C:
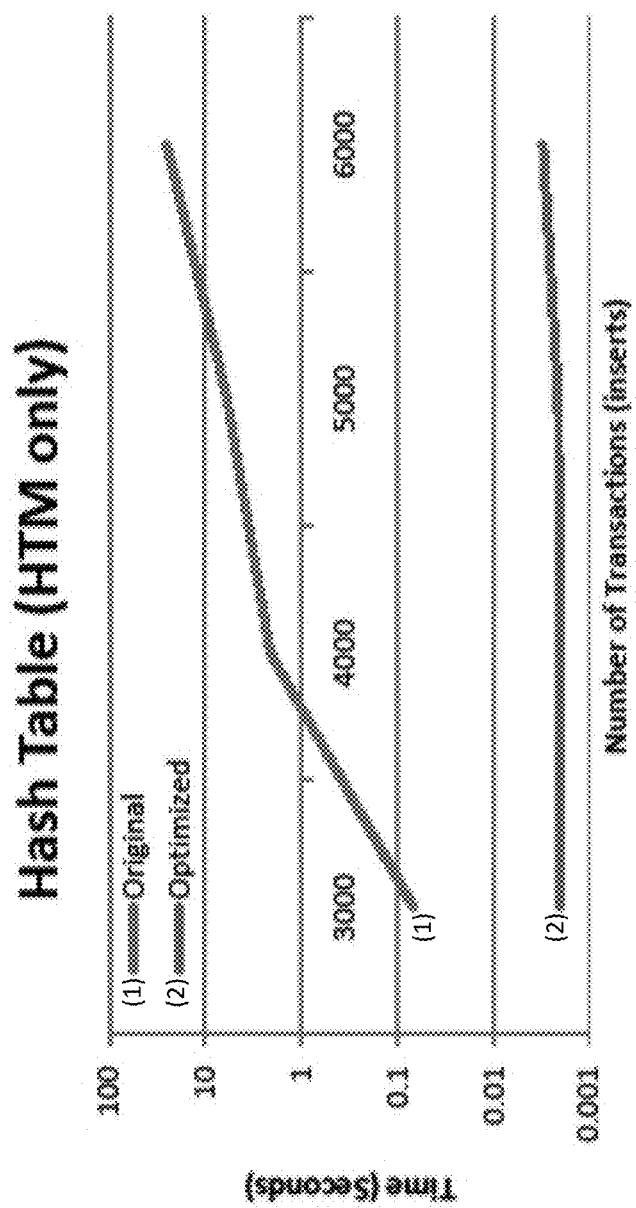

This has been experimentally demonstrated by including the optimization results of three micro-benchmarks using four threads on a four-core RTM machine. FIG. 15A illustrates results for linked list with HTM and SGL, FIG. 15B illustrates results for a linked list with HTM only, and FIG. 15C illustrates results for a hash table with HTM only). Each graph plots the original performance (1) (without the embodiments of the invention described herein) against the optimized performance after considering the resulting profiled data (2) (realized via the embodiments of the invention). Consequently, it can be seen that the embodiments of the invention result in significant time improvements over prior implementations.

Figure 16:
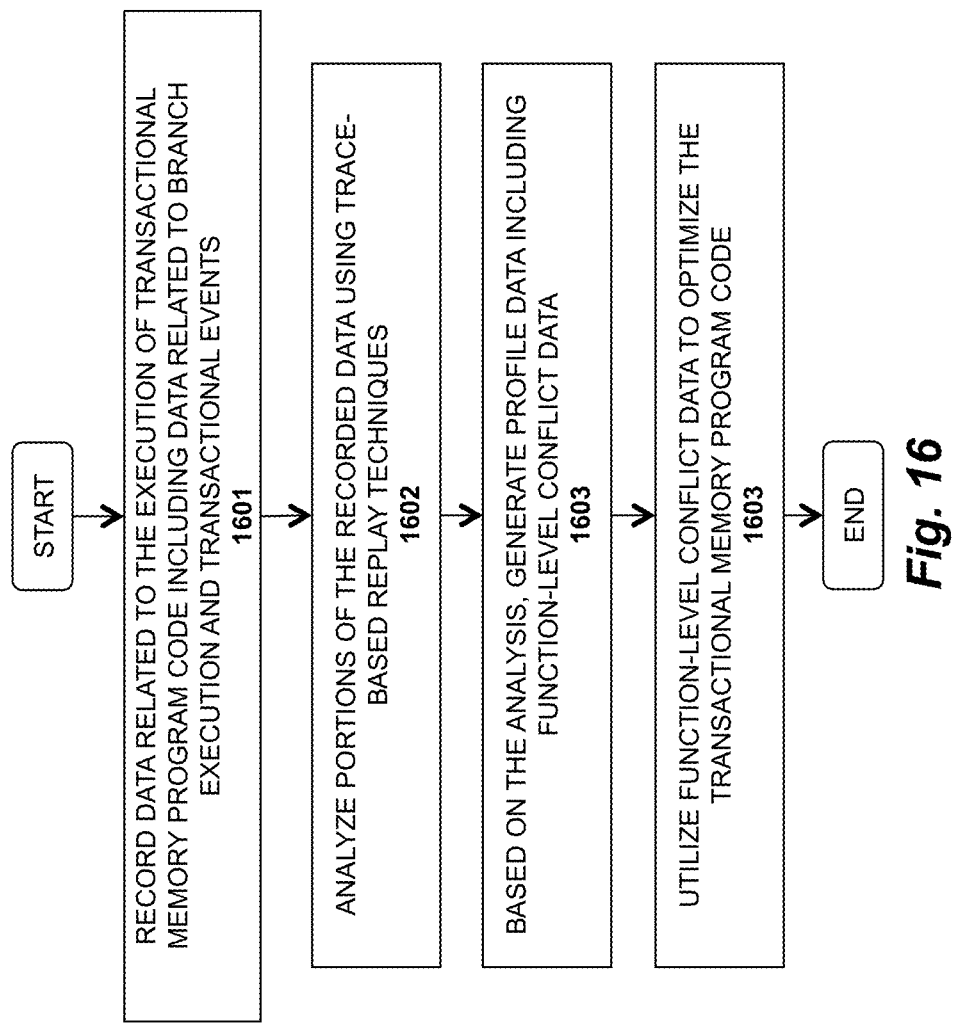
FIG. 16 illustrates a method in accordance with one embodiment of the invention.

A method in accordance with one embodiment of the invention is illustrated in FIG. 16. The method may be implemented within the context of the architectures described above, but is not limited to any specific architectures.

At 1601, data is recorded related to the execution of transactional memory program code. As mentioned, in one embodiment, the data includes data related to the execution of branches and transactional events in the transactional memory program code. The data may be stored, for example, in a log/trace file or database.

At 1602, portions of the recorded data are analyzed using trace-based replay techniques and, at 1603, based on the analysis, profile data is generated which includes an indication of function-level conflicts. For example, as discussed above, the profiler may extract the transaction-level events from the recorded data and cross-correlate the transaction-level events to disassembled binary information from the transactional memory program code. The profiler may then generate a result of the cross-correlation comprising an identified function which was executed when a transaction abort operation occurred.

Finally, at 1604, the function-level conflict data may be used to optimize the transactional memory program code. For example, once a transaction abort operation has been associated with a specific function, that function and/or the program code surrounding that function may be modified so that the abort operation does not occur again or occurs less frequently.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. An apparatus comprising:
 a transactional debugger (TDB) recording circuitry to record data related to the execution of transactional memory program code, including data related to the execution of branches and transactional events in the transactional memory program code;

a profiler circuitry to perform a plurality of tasks to analyze portions of the recorded data using trace-based replay techniques to responsively generate profile data comprising transaction-level events and function-level conflict data usable to optimize the transactional memory program code, wherein the plurality of tasks comprises:

analyzing the data related to the execution of branches and transactional events to generate the transaction-level events with function-level conflict data;

extracting the transaction-level events and cross-correlate the transaction-level events to disassembled binary information from the transactional memory program code, and generating a result of the cross-correlation comprising an identified function which was executed when a transaction abort operation occurred, wherein when a transaction abort is detected for a transaction, the profiler circuitry is to perform a reverse lookup to identify a corresponding transaction begin event and, once identified, to capture a timestamp range of all possible branches taken during the transaction's execution, the profiler circuitry is further to compare instruction pointers (IPs) from the branches contained within the surrounding timestamp range against the disassembled binary information from the transactional memory program code to identify corresponding IPs in the disassembled binary information.

2. The apparatus as in claim 1 wherein the profiler circuitry is additionally to identify one or more functions that use those IPs, thereby allowing a user to see which one or more functions should be analyzed for performance optimizations.

3. The apparatus as in claim 1 further comprising:
data parsing circuitry to extract the portions of the recorded data related to the execution of transactional memory program code to be analyzed by the profiler circuitry.

4. The apparatus as in claim 3 wherein the data parsing circuitry is to extract shared memory and transactional event packet information recorded by the TDB recording circuitry.

5. The apparatus as in claim 4 wherein the transactional event packet information includes timestamp information indicating times associated with different transactional events.

6. The apparatus as in claim 5 wherein the universal timestamp information comprises transaction start timing data, transaction end timing data, and/or transaction abort timing data.

7. The apparatus as in claim 4 wherein the transactional event packet information further includes branch trace packet information comprising information about branches that are taken throughout the transactional memory program code.

8. A method comprising:
recording data related to the execution of transactional memory program code, including data related to the execution of branches and transactional events in the transactional memory program code;

analyzing portions of the recorded data using trace-based replay techniques to responsively generate profile data comprising transaction-level events and function-level conflict data usable to optimize the transactional memory program code, including analyzing the data related to the execution of branches and transactional events to generate the transaction-level events with function-level conflict data and extracting the transaction-level events and cross-correlate the transaction-level events to disassembled binary information from the transactional memory program code;

generating a result of the cross-correlation comprising an identified function which was executed when a transaction abort operation occurred;

performing a reverse lookup to identify a corresponding transaction begin event when a transaction abort is detected for a transaction;

once the corresponding transaction begin event is identified, capturing a timestamp range of all possible branches taken during the transaction's execution; and comparing instruction pointers (IPs) from the branches contained within the surrounding timestamp range against the disassembled binary information from the transactional memory program code to identify corresponding IPs in the disassembled binary information.

9. The method as in claim 8 further comprising:
identifying one or more functions that use those IPs, thereby allowing a user to see which one or more functions should be analyzed for performance optimizations.

10. The method as in claim 8, further comprising:
extracting the portions of the recorded data related to the execution of transactional memory program code to be analyzed by a profiler circuitry.

11. The method as in claim 10, further comprising: extracting shared memory and transactional event packet information recorded by a TDB recording circuitry.

12. The method as in claim 11 wherein the transactional event packet information includes timestamp information indicating times associated with different transactional events.

13. The method as in claim 12 wherein the universal timestamp information comprises transaction start timing data, transaction end timing data, and/or transaction abort timing data.

14. The method as in claim 11 wherein the transactional event packet information further includes branch trace packet information comprising information about branches that are taken throughout the transactional memory program code.

\* \* \* \* \*